US009740882B2

(12) United States Patent
Scott-Nash et al.

(10) Patent No.: US 9,740,882 B2
(45) Date of Patent: Aug. 22, 2017

(54) SENSOR PRIVACY MODE

(71) Applicant: Intel Corporation, Santa Clara, CA (US)

(72) Inventors: Mark E. Scott-Nash, Boulder, CO (US); Scott H. Robinson, Portland, OR (US); Howard C. Herbert, Phoenix, AZ (US); Geoffrey S. Strongin, Beaverton, OR (US); Stephen J. Allen, Santa Clara, CA (US); Tobias M. Kohlenberg, Portland, OR (US); Uttam K. Sengupta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 202 days.

(21) Appl. No.: 14/482,460

(22) Filed: Sep. 10, 2014

(65) Prior Publication Data

US 2015/0248566 A1 Sep. 3, 2015

Related U.S. Application Data

(60) Provisional application No. 61/946,059, filed on Feb. 28, 2014.

(51) Int. Cl.
*G06F 21/00* (2013.01)
*G06F 21/62* (2013.01)
(Continued)

(52) U.S. Cl.
CPC .......... *G06F 21/629* (2013.01); *G06F 21/604* (2013.01); *G06F 21/6245* (2013.01);
(Continued)

(58) Field of Classification Search
CPC ...... G06F 21/121; G06F 21/60; G06F 21/604; G06F 21/606; G06F 21/62; G06F 21/6245; G06F 21/6254
See application file for complete search history.

(56) References Cited

U.S. PATENT DOCUMENTS 8,146,164 B2  3/2012 Eshun et al.
2006/0234758 A1  10/2006 Parupudi
(Continued)

FOREIGN PATENT DOCUMENTS

CN      100580682     1/2010
TW      I308451       4/2009
WO      WO2013-144966 10/2013

OTHER PUBLICATIONS

International Searching Authority, "Notification of Transmittal of the International Search Report and the Written Opinion of the International Searching Authority," mailed May 18, 2015, in International application No. PCT/US2015/017923.
(Continued)

*Primary Examiner* — Edward Zee
(74) *Attorney, Agent, or Firm* — Trop, Pruner & Hu, P.C.

(57) ABSTRACT

Technologies for sensor privacy on a computing device include receiving, by a sensor controller of the computing device, sensor data from a sensor of the computing device; determining a sensor mode for the sensor; and sending privacy data in place of the sensor data in response to a determination that the sensor mode for the sensor is set to a private mode. The technologies may also include receiving, by a security engine of the computing device, a sensor mode change command from a user of the computing device via a trusted input/output path of the computing device; and sending a mode command to the sensor controller to set the sensor mode of the sensor based on the sensor mode change command, wherein the sending the mode command comprises sending the mode command over a private bus established between the security engine and the sensor controller. Other embodiments are described herein.

25 Claims, 10 Drawing Sheets

(51) Int. Cl.
    *G06F 21/60* (2013.01)
    *H04W 12/02* (2009.01)
(52) U.S. Cl.
    CPC ........ *G06F 21/6254* (2013.01); *H04W 12/02* (2013.01); *G06F 2221/2111* (2013.01)

(56) References Cited

U.S. PATENT DOCUMENTS

| | | |
|---|---|---|
| 2008/0066075 A1 | 3/2008 | Nutter et al. |
| 2012/0159172 A1* | 6/2012 | Saxena .................. G06F 21/57 713/171 |
| 2016/0150361 A1* | 5/2016 | Zhu ....................... H04W 64/00 455/456.1 |

OTHER PUBLICATIONS

Taiwan Intellectual Property Office, Office Action mailed Oct. 14, 2016 in Taiwan Patent Application No. 104101981.

* cited by examiner

SENSOR PRIVACY MODE

This application claims priority to U.S. Provisional Patent Application No. 61/946,059 filed on Feb. 28, 2014 and entitled "Technologies for Sensor Privacy", the content of which is hereby incorporated by reference.

BACKGROUND

Computing devices are becoming ubiquitous tools for personal, business, and social uses. Computing devices are embodied as various electrical devices including, for example, smartphones, smart appliances, computers, consumer electronic devices (e.g., network connected smart thermostats), home appliances (e.g., network connected smart refrigerators), mobile computing nodes, wearable computing nodes (e.g., smart glasses, network connected wristbands that monitor physiological metrics of a user), and other electronic devices including those in the "Internet of Things". Recently, computing devices have been evolving to include an increasing number and variety of sensors. At the same time, computing devices are increasingly interconnected (e.g., connected with the Internet) and, oftentimes, are kept in an active or powered-on state.

Unfortunately, the inclusion of sensors in various computing devices can pose a security or privacy threat for the end user. For example, malware may be unknowingly installed and executed on the computing device to surreptitiously intercept or monitor sensor data generated by the sensors of the computing device. Such interception or monitoring may be done without the knowledge of the user of the computing device. Additionally, even authorized applications (e.g., social media applications) and hardware of the computing device may utilize the sensors and sensor data of the computing device without the user's knowledge and/or ability to control (e.g., turn off) such usage. Even in those computing devices in which a user can turn off the sensor data stream from a sensor, such functionality may be subject to security attacks.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
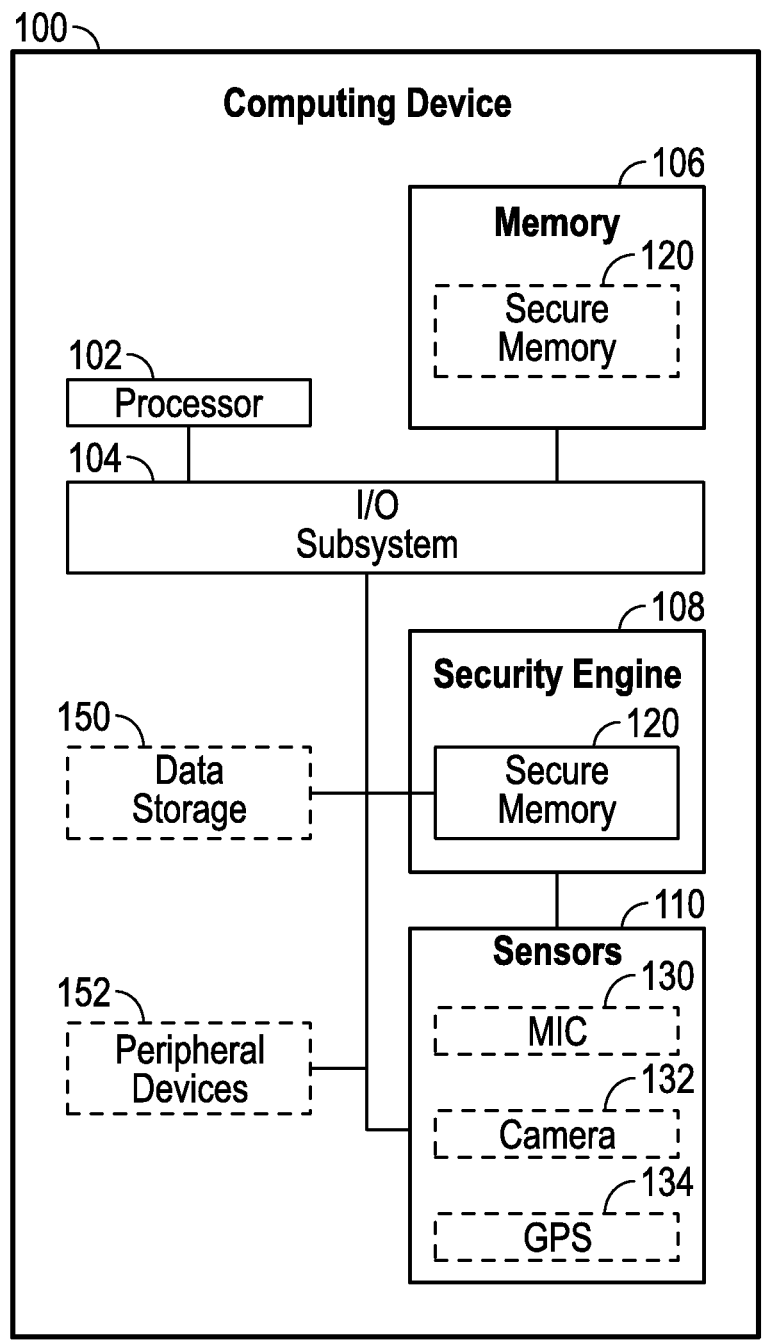
FIG. 1 is a simplified block diagram of at least one embodiment of a computing device including sensor privacy technology.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims. References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C). In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 includes sensor privacy technology to allow a user of the computing device 100 to securely control the functionality of one or more sensors 110 of the computing device 100. To do so, as discussed in more detail below, the user may set a sensor mode of each sensor 110 using a trusted input/output (I/O) path of the computing device 100. The sensor mode for each sensor 110 is enforced by an associated sensor controller (see FIG. 2). In the "normal" or "non-private" sensor mode, the sensor controller passes any sensor data received from the associated sensor 110 to the operating system/middleware and/or any requesting application. However, if the sensor mode is set to a "privacy" or "private mode" setting, the sensor controller replaces some or all of the sensor data with privacy data and sends the privacy data to the operating system/middleware and/or any requesting application. In the illustrative embodiment, the privacy data is embodied as one or more well-formed data packets appropriate for the particular sensor. For example, the privacy data may be embodied as white noise for a microphone sensor, a random or pre-defined picture or a picture with a lower resolution or faces/landmarks pixelated for a camera or other imaging sensor, a pre-defined location (e.g., the North Pole), a coarse-grain position (e.g., Zip code vs. actual Latitude/Longitude) for a location sensor, and so forth. It should be appreciated that host software executed on the computing device 100 is unable to determine whether the data is actual sensor data or the privacy data due to the formation of the privacy data since the data formats expected by the OS/middleware and applications are not changed The computing device 100 may be embodied as any type of computing device including or coupled (via wired or wireless connection in near field or cloud based) to one or more sensors. For example, the computing device 100 may be embodied as a smartphone, a cellular phone, a tablet computer, a notebook computer, a laptop computer, a desktop computer, a distributed computing system, a multiprocessor system, a consumer electronic device, a smart appliance, a consumer electronic device (e.g., thermostats), a home appliance (e.g., smart refrigerators), a mobile computing node, a wearable computing node (e.g., glasses, wristbands), electronic devices including those in the "Internet of Things"), and/or any other computing device capable of user authentication as described below. As shown in FIG. 1, the illustrative computing device 100 includes a processor 102, an I/O subsystem 104, memory 106, a security engine 108, and one or more sensors 110. Of course, the computing device 100 may include other or additional components, such as those commonly found in a computer (e.g., various I/O devices), in other embodiments. Additionally, in some embodiments, one or more of the illustrative components may be incorporated in, or otherwise from a portion of, another component. For example, the memory 106, or portions thereof, may be incorporated in the processor 102 in some embodiments.

The processor 102 may be embodied as any type of processor capable of performing the functions described herein. For example, the processor may be embodied as a single or multi-core processor(s), digital signal processor, microcontroller, or other processor or processing/controlling circuit. Similarly, the memory 106 may be embodied as any type of volatile or non-volatile memory or data storage capable of performing the functions described herein. In operation, the memory 106 may store various data and software used during operation of the computing device 100 such as operating systems, applications, programs, libraries, and drivers. The memory 106 is communicatively coupled to the processor 102 via the I/O subsystem 104, which may be embodied as circuitry and/or components to facilitate I/O operations with the processor 102, the memory 106, and other components of the computing device 100. For example, the I/O subsystem 104 may be embodied as, or otherwise include, memory controller hubs, I/O control hubs, firmware devices, communication links (i.e., point-to-point links, bus links, wires, cables, light guides, printed circuit board traces, etc.) and/or other components and subsystems to facilitate the I/O operations. In some embodiments, the I/O subsystem 104 may form a portion of a system-on-a-chip (SoC) and be incorporated, along with the processor 102, the memory 106, and other components of the computing device 100, on a single integrated circuit chip.

The security engine 108 may be embodied as any type of processor or processing circuit capable of performing secure execution of instructions or providing security services to the computing device 100. For example, the security engine 108 may be embodied as a security co-processor, a secure cryptoprocessor such as a trusted platform module (TPM), a manageability engine, a cryptographic accelerator processor, or the like. In some embodiments, the security engine 108 is embodied as an embedded out-of-band (OOB) microprocessor, separate from processor 102, capable of executing code and addressing data inaccessible to the processor 102. Such strict separation of the processor 102 and the security engine 108 also enhances platform security. Although shown in FIG. 1 as a separate component, the security engine 108 may form a portion of, or otherwise be embodied in, the I/O subsystem 104 or other component of the computing device 100.

The security engine 108 includes a secure memory 120. The secure memory 120 is accessible only by the security engine 108. That is, the secure memory 120 is inaccessible by the processor 102. Although shown in FIG. 1 as included in the security engine 108 itself, the secure memory 120 may form a portion of the memory 106 in some embodiments (e.g., a secured portion of the memory 106). The security engine 108 may store various data, such as the privacy data and a policy database, in the secure memory 120. In use, a user of the computing device 100 may set the sensor mode for one or more of the sensors 110 by communicating with the security engine 108 via a trusted I/O path as discussed in more detail below in regard to FIG. 2.

The sensors 110 may be embodied as one or more sensors capable of generating sensor data indicative of sensed stimuli. For example, as shown in FIG. 1, the sensors 110 may include a microphone 130, a camera 132, and/or a location circuit such as a global positioning system (GPS) circuit 134. In such embodiments, the microphone 130 may be embodied as any type of audio recording device capable of receiving audio signals and generating sensor data indicative of such audio signals. Similarly, the camera 132 may be embodied as any type of imaging device capable of capturing still or moving images. The GPS circuit 134 may be embodied as any type of location sensor capable of generating sensor data indicative of the location of the computing device 100. Of course, in other embodiments, the computing device 100 may include additional or other sensors.

In some embodiments, the computing device 100 may also include a data storage 150 and/or other peripheral devices 152. The data storage 150 may be embodied as any type of device or devices configured for short-term or long-term storage of data such as, for example, memory devices and circuits, memory cards, hard disk drives, solid-state drives, or other data storage devices. The peripheral devices 152 may include any type of peripheral device commonly found in a typical computing device, such as various I/O devices. For example, the peripheral devices 152 may include communication circuitry, display circuitry, various input buttons and switches, a keyboard, a mouse, speaker, microphone, and/or other peripheral devices.

Figure 2:
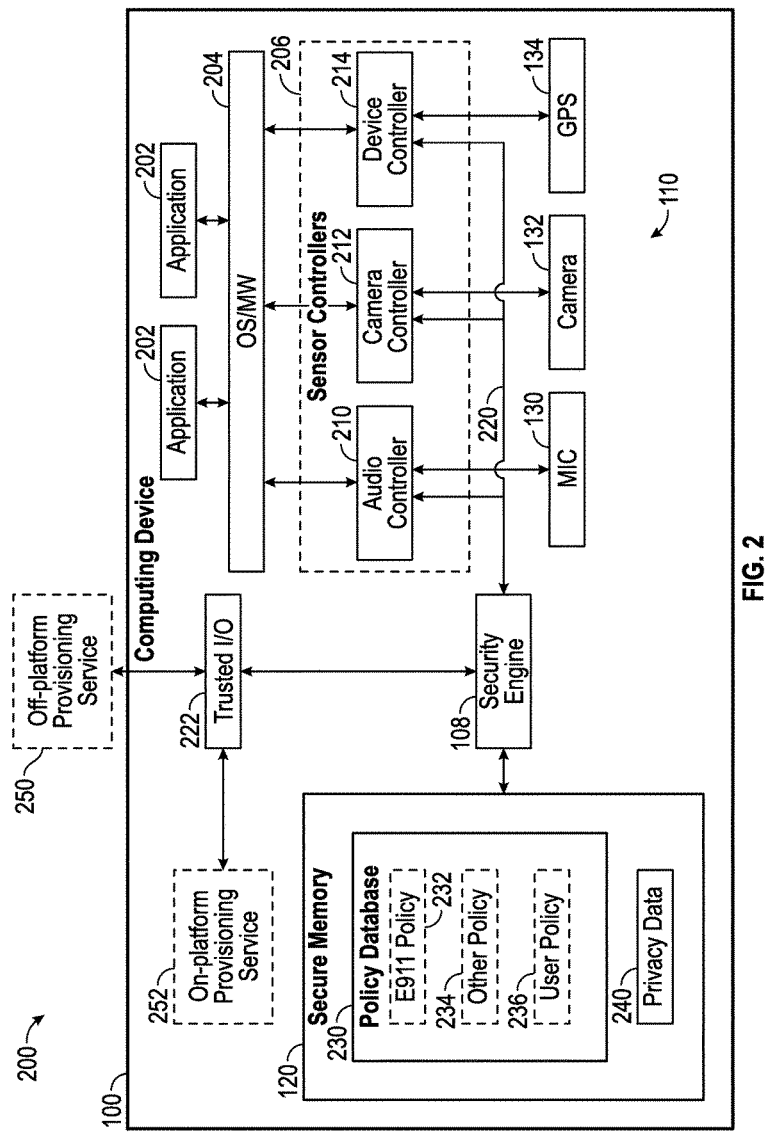
FIG. 2 is a simplified block diagram of at least one embodiment of an environment of the computing device of FIG. 1.

Referring now to FIG. 2, in the illustrative embodiment, the computing device 100 establishes an environment 200 during operation. Illustratively, the environment 200 includes one or more applications 202, which communicate with an operating system or other middleware 204. As discussed above, the computing device 100 includes one or more sensors 110, each of which is controlled by a sensor controller 206. For example, as shown in FIG. 2, the sensor controllers 206 illustratively include an audio controller 210 that controls the functionality of the microphone sensor 130, a camera controller 212 that controls the functionality of the camera sensor 132, and a device controller 214 that controls the functionality of the GPS circuit 134. Of course, in other embodiments, the sensor controllers 206 may include additional or other sensor controls depending on the particular sensors 110 included in the computing device 100. Each of the sensor controllers 206 may be embodied as hardware, firmware, software, or a combination thereof.

As discussed in more detail below, the sensor controllers 206 implement a sensor mode for each of the associated sensors 110. The sensor mode of each sensor controller 206 is controlled by the security engine 108. For example, to change the sensor mode of a sensor 110 from "normal" or "non-private" mode to "privacy" or "private" mode, or visa-versa, the security engine 108 may communicate a mode command (sometimes referred to as "sensor mode change command") to the corresponding sensor controller 206 over a private bus 220 established between the security engine 108 and each of the sensor controllers 206 as shown in FIG. 2 The private bus 220 may be embodied as any type of OOB (or side-band) communication path, which is not visible by the OS/middleware 204 and/or applications 202, dedicated to facilitating communication between the security engine 108 and the sensor controllers 206. For example, in some embodiments, the private bus 220 may be embodied as an interprocessor communication bus established between the security engine 108 and each of the sensor controllers 206.

As discussed above, a user of the computing device 100 may set or change the sensor mode of any one of the sensors 110. To do so, the user may communicate a desired sensor mode change command to the security engine 108 over a trusted I/O path 222. The trusted I/O path 222 may be embodied as, or otherwise include, any hardware or software components capable of ensuring communication between the user and the security engine 108 is protected from host software, including the OS/middleware 204 and/or applications 202. For example, the trusted I/O path 222 may be established as an enclavized application, virtualization memory views, encrypted tunnels between the security engine 108 and an off-platform service that utilize preset personalized verification data, and/or other secure I/O technologies.

The enclavized application may include a secure enclave such as an Intel® Software Guard Extension (Intel® SGX) (sometimes referred to as Intel® Secure Enclave), wherein various embodiments of secure enclaves are described in, for example, the U.S. patent application entitled "Method and Apparatus to Provide Secure Application Execution", filed Nov. 13, 2009 (Ser. No. 12/590,767); the U.S. patent application entitled "System and Method for Implementing a Trusted Dynamic Launch and Trusted Platform Module (TPM) Using Secure Enclaves", filed Dec. 22, 2010 (Ser. No. 12/976,831); and the PCT Patent Application entitled "Technologies For Hardening The Security Of Digital Information On Client Platforms", filed Jun. 4, 2013 (Application No. PCT/US2013/44158).

In response to the sensor mode change command, the security engine 108 may evaluate the sensor mode change command based on a policy rule of a policy database 230 stored in the secure memory 120. The policy database 230 may be stored in the secure memory 120 in an encrypted or otherwise protected state. The policy database 230 may include one or more policies that define the parameters under which the sensor mode of a sensor may be modified by the user. In the illustrative embodiment, the policy database 230 includes a tiered or multi-level policy structure. For example, the policy database 230 may include an emergency 911 policy 232, an other policy 234, and a user policy 236 (and/or other policies). The multi-level policy structure may allow such features as emergency 911 calling by a user on a smartphone. A middle level policy may be used by IT personnel for enterprise Bring-Your-Own-Device (BYOD) or as parental control. A user policy may define which sensors the user desires to be maintained in a particular mode (e.g., "privacy mode"). For example, an embodiment of a policy may dictate that with a sensor mode in PrivacyMode1 only sensor1 (e.g., sensor 130) may be in private mode while sensor2 (e.g., sensor 132) and sensor3 (e.g., sensor 134) are not in private mode. However, in PrivacyMode2 each of sensor1, sensor2, and sensor3 may be in private mode.

Regardless, it should be appreciated that the policy database 230 is securely provisioned with the individual policies. To do so, the trusted I/O 222 may be used as discussed above. Additionally or alternatively, the policy database 230 may be securely provisioned via use of an off-platform provision service 250 and/or an on-platform provision service 252. The root of trust is established in the security engine 108 to securely provision the multi-tiered policy database 230. For example, the security engine 108 may ensure all firmware used to establish the disclosed sensor privacy is cryptographically signed and verified.

In some embodiments, the security engine 108 may also store the privacy data 240 in the secure memory 120. In such embodiments, the security engine 108 may provide the appropriate privacy data 240 to the corresponding sensor controller 206 in response to a change of sensor mode to the "privacy" setting. Alternatively, in other embodiments, each of the sensor controllers 206 may locally store, or otherwise retrieve, the privacy data 240.

Figure 3:
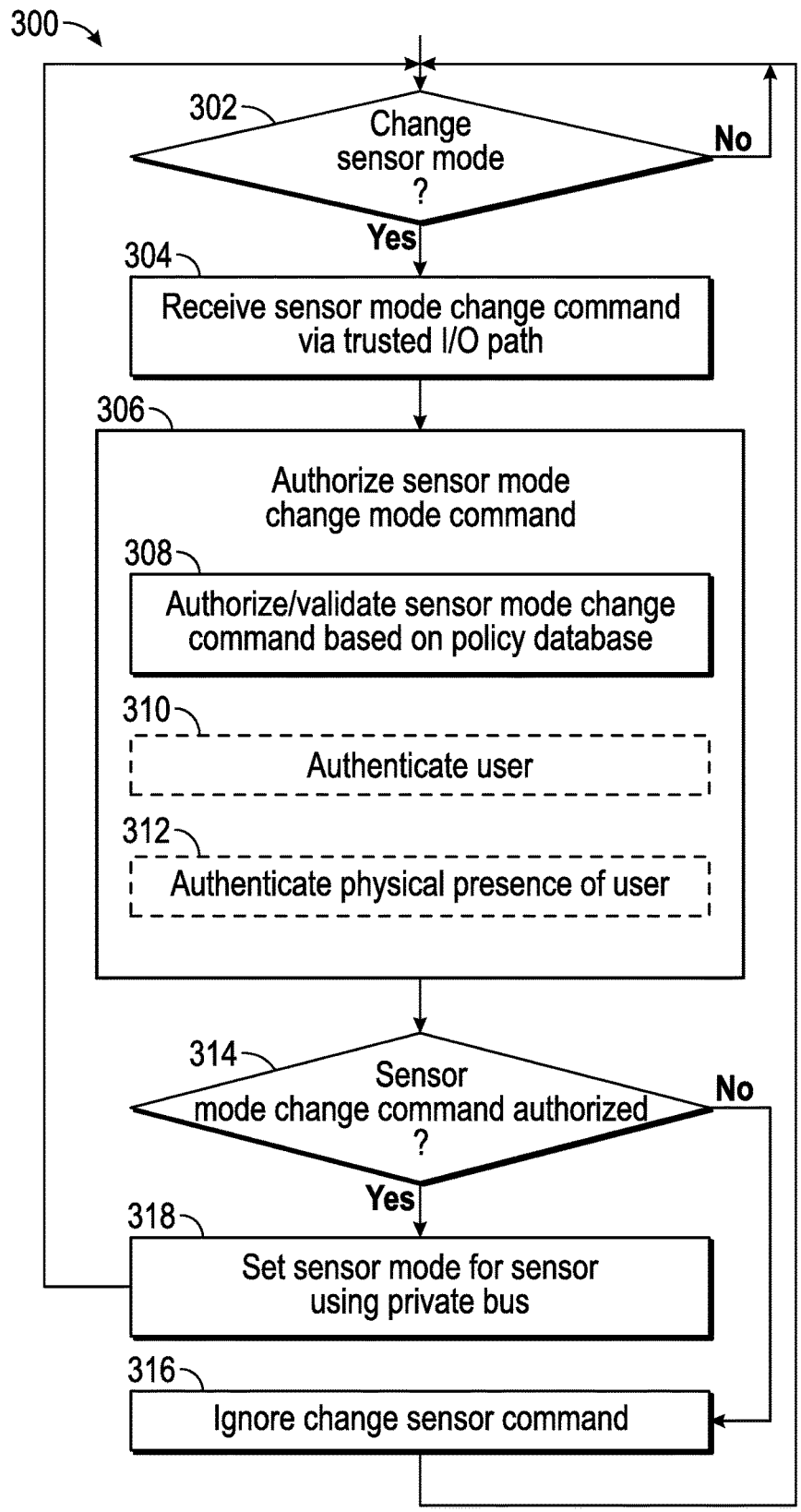
FIG. 3 a simplified flow diagram of at least one embodiment of a method for changing a sensor mode of a sensor of the computing device of FIG. 1.

Referring now to FIG. 3, in use, the security engine 108 of the computing device 100 may execute a method 300 for changing or updating a sensor mode of a sensor 110 of the computing device 100. The method 300 begins with block 302 in which the security engine 108 determines whether a user desires to change the sensor mode of one or more sensors 110 of the computing device 100. For example, such a desire may be communicated via the user manipulating (e.g., push, sliding, twisting) a hardware switch and/or by tapping an icon on a graphical user interface. If a desire to change the sensor mode is determined, the method 300 advances to block 304 in which the security engine 108 receives a sensor mode change command from the user via the trusted I/O path 222. The sensor mode change command may identify the particular sensor(s) and the desired sensor mode for each selected sensor (e.g., "non-private"/"normal" or "private" or some gradation of "private"). For example, this may allow a parent to disable a child's ability to put a GPS sensor in private mode. The trusted I/O path 222 may be embodied as, or otherwise include, any hardware or software components capable of ensuring communication between the user and the security engine 108.

In block 306, the security engine authorizes the sensor mode change command received from the user. To do so, in block 308, the security engine may authorize or validate the sensor mode change command based on one or more policies stored in the policy database 230. For example, in some embodiments, the user policy 236 may define which user is allowed to change the sensor mode for a particular sensor 110 or set of sensors 110. In such embodiments, the security engine may ensure the present user is authorized to modify the sensor mode of the desired sensor 110 based on the user policy 236.

Additionally, in some embodiments, the security engine may also authenticate the user in block 310. Such authentication may further establish the trusted I/O path between the security engine 108 and the user input. For example, user authentication may be accomplished by utilizing one of the sensor controllers 206, such as the audio controller 210, to perform voice, image, or other biometric recognition. In such embodiments, the sensor controller 206 used for user authentication may communicate directly with the security engine 108 via the private bus 220. In such embodiments, the processor 102 and host software (e.g., applications 202) would have no access to the user authentication data captured by the sensor controller 206.

Further, in some embodiments, the security engine 108 may additionally or alternatively authenticate the physical presence of the user to the computing device 100 in block 312. Such user presence authentication may further establish the trusted I/O path between the security engine 108 and the user input. To do so, the user may be requested to interact with a physical or virtual switch of the computing device 100, which is coupled to a general purpose I/O port of the security engine 108. In this way, the physical presence of the user may be authenticated.

In block 314, the security engine 108 determines whether the sensor mode change command was successfully authorized in block 306. If not, the method 300 advances to block 316 in which the sensor mode change command is ignored. However, if the sensor mode change command is authorized, the method 300 advances to block 318. In block 318, the security engine 108 sets the sensor mode of the selected sensor 110 using the private bus 220. To do so, for example, the security engine 108 may transmit a sensor mode change command to the sensor controller 206 of the selected sensor 110 over the private bus 220 to set the sensor mode to the desired setting (e.g., "normal"/"non-private" or "private").

Figure 4:
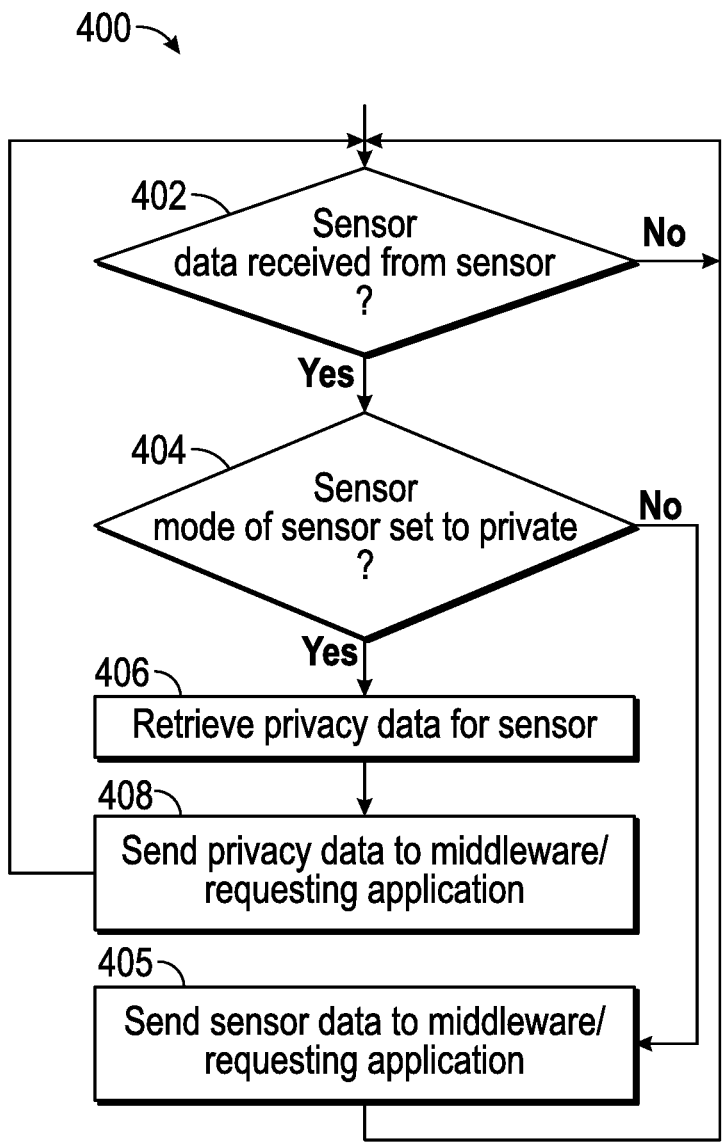
FIG. 4 is a simplified flow diagram of at least one embodiment of a method for managing sensor data generated by the sensor of the computing device of FIG. 1 based on the present sensor mode of the sensor.

Referring now to FIG. 4, in use, each sensor controller 206 of the computing device 100 may execute a method 400 for managing sensor data generated by a corresponding sensor 110. The method 400 begins with block 402 in which the sensor controller 206 determines whether any sensor data has been received from the corresponding sensor 110. As discussed above, in some embodiments, the sensors 110 may be configured in an "always-on" state such that the sensor 110 is continually generating sensor data (e.g., audio data from the microphone 130). If sensor controller 206 determines that sensor data has been received from a sensor 110, the method 400 advances to block 404. In block 404 the sensor controller 206 determines whether the sensor mode for the sensor 110 generating the sensor data is set to a private mode. If not, the method 400 advances to block 405 in which the sensor controller 206 sends the sensor data to the OS/middleware 204 and/or the requesting application 202 (e.g., the sensor controller 206 passes the sensor data up through the software stack).

If, however, the sensor controller 206 determines that the sensor mode of the sensor 110 is set to a private mode, the method 400 advances to block 406. In block 406, the sensor controller 206 retrieves the privacy data 240 associated with the sensor 110. To do so, the sensor controller 206 may retrieve or receive the privacy data 240 from the security engine 108, directly from the secure memory 120, or may locally store the privacy data 240. As discussed above, the privacy data 240 is embodied as one or more well-formed data packets appropriate for the particular sensor 110. For example, the privacy data 240 may be embodied as white noise for the microphone sensor 130, an alternate or modified or a random or pre-defined picture for a camera sensor 132, a pre-defined location for the GPS sensor 134, or other data indistinguishable from real sensor data by the host software of the computing device 100.

Subsequently, in block 408, the sensor controller 206 sends the privacy data 240 to the OS/middleware 204 and/or the requesting application 202 (e.g., the sensor controller 206 passes the sensor data up through the software stack). Because the privacy data 240 is well-formed and suited for the particular sensor, neither the OS/middleware nor the applications 202, or malware, is capable of controlling the sensors 110 or determining whether the received sensor data is actual sensor data or duped data (i.e., the privacy data 240). Also, no application (that is visible to the OS) is needed to set a sensor mode. Such an application (and any related solution) would be both visible and controllable at the OS level. Malware may gain visibility to such sensors. Where the sensor state is displayed to the user, such as the camera-ON LED, malware may spoof the state (e.g., turn off the LED). In contrast, embodiments of the invention greatly reduce the attack surface by isolating sensor state control from the OS and all host software, including malware. This gives the end user greater control of the use of sensor data because no host software is aware of the sensor state based on the form of the sensor data packet. In other words, embodiments disclosed herein may significantly reduce the attack surface of the computing device 100 by isolating sensor state control from the OS/middleware 204 and all host software (e.g., applications 202), including any malware. Additionally, the disclosed technologies provide the user of the computing device 100 with greater control sensor data because no host software is aware of the sensor state due to the formation of the privacy data 240. Further, by using the disclosed technologies, the sensors 110 need not be powered down and the sensor data need not be throttled, rather the privacy data 240 is substituted for the actual sensor data as discussed above.

As mentioned above, privacy and security is an increasing concern for computing device users. For example, applications (that are visible to the OS) can be aware of a user's location and movement and may control the camera and microphone of the user's computing device. The location, movement, camera, and microphone information may be made available to others as part of a legitimate business model or through criminal activity. Again, as mentioned above, there are instances where a user may want to control the availability and the accuracy of the sensor data to maintain privacy. However, some legitimate applications rely upon the sensor data in order to function and may refuse to function in the absence of sensor data. Such applications may detect any attempt to feed the application false sensor data, such as a loop of previously recorded image data that is repeatedly disclosed to the application in lieu of accurate sensor data. An embodiment provides a high confidence mechanism for user control over the availability and granularity (e.g., amount of detail) of the sensor data provided to application without requiring cooperation from the OS and without making changes detectable to the application.

Figure 5:
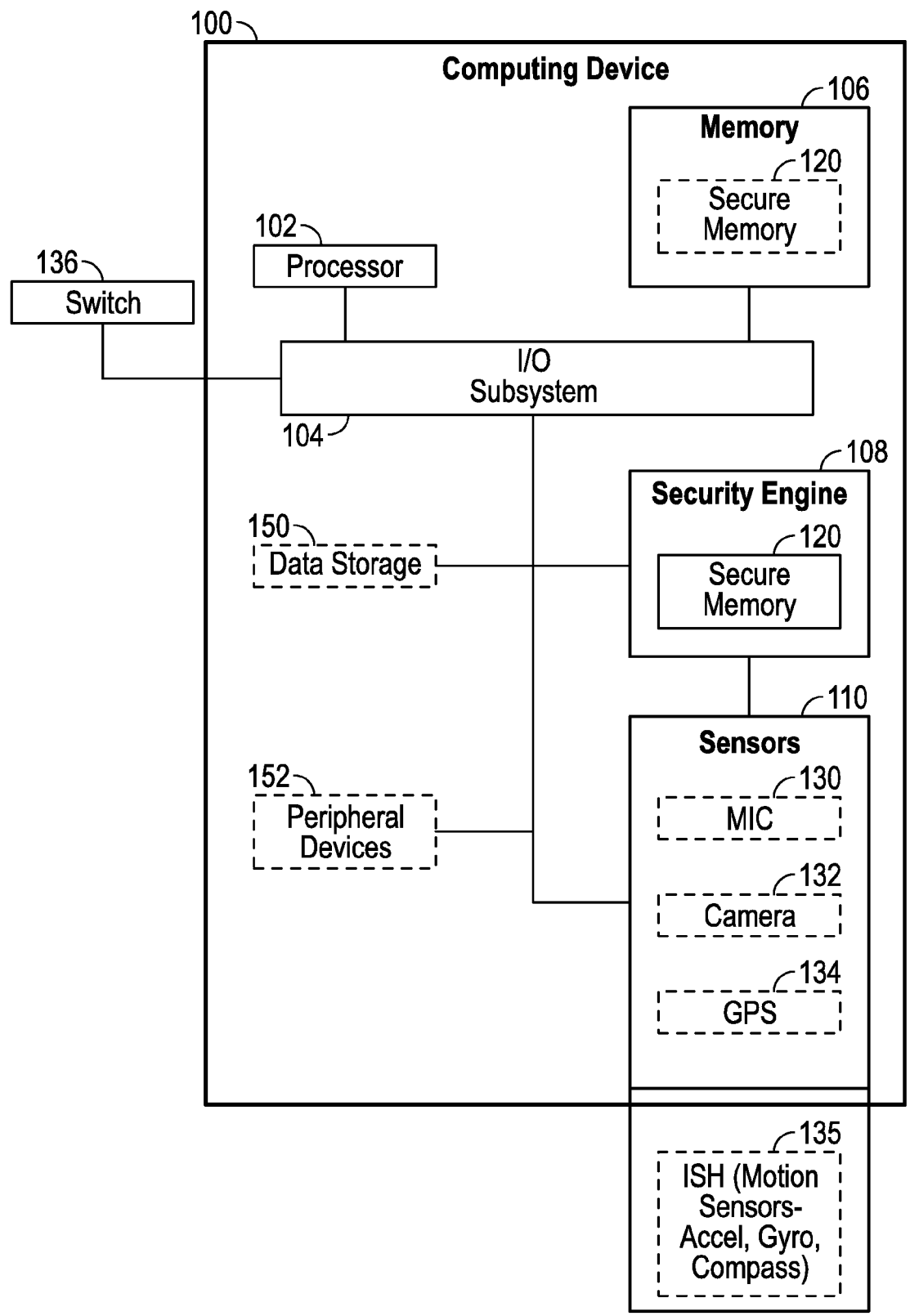
FIG. 5 is a simplified block diagram of at least one embodiment of a computing device including sensor privacy technology.

FIG. 5 is similar to FIG. 1 and similar terms are not discussed again for sake of brevity. FIG. 5 includes Integrated Sensor Hub (ISH) 135, such as an Apple® M7, Qualcomm® Snapdragon Sensor Core, Atmel® sensor hub, and the like. A sensor hub is a microcontroller unit/coprocessor that integrates data from different sensors and processes them. In FIG. 5 ISH 135 includes motions sensors such as, for example, an accelerometer, gyroscope, and compass. The ISH helps off-load sensing processing from processor 102, thus saving battery consumption and providing a performance improvement. In non-private mode sensor data collected by ISH 135 may be passed back to the main OS and applications in band with the OS. When system 100 is set in private (also known as "cloaking") mode via hardware switch 136, the flow of sensor data is modified to route sensor data from ISH 135 (or other sensor controllers) through security engine 108 before being sent to applications requesting/receiving the information. The decision to route the sensor data through security engine 108 may be in response to a designated global hardware bit being sensed by processor 102 and other functional blocks (e.g., security engine 108) to indicate private mode is set. The security engine 108 gets the sensor data from ISH 135 (and/or other sensor controllers) and applies appropriate policies to the sensor data. OS visible applications are unaware of this data routing and continue to function normally.

Switch 136 may be located on the outside package or case of system 100. The switch may be in addition to, for example, a power or volume button on a smart device case such as an exterior of a smartphone or smart wearable device (e.g., spectacles that communicate over a network and the like). Switch 136 may have dual functions and may indeed be the power or volume buttons (or other traditional buttons). Switch 136 may be manipulated with a first sequence (e.g., a single push on the volume button) to call the traditional function (e.g., increase volume) or with a second sequence (e.g., three quick consecutive pushes on the volume button) to call a different function such as moving from private mode to non-private mode for one or more sensors. The use of the hardware switch lets the user know the cloaking switch has been activated in a very obvious manner. Also, a hardware switch based solution is harder to compromise than an OS visible software based solution. Such a switch may be multi-way switch where the switch placed in one middle position is in "normal" mode, in a "left" position the device is in "silent" mode", and in a "right" position is in "private" mode. Activation of the private or non-private modes via switch 136 may be accompanied by an icon on a screen of device 100 that indicates the sensor mode. Furthermore, applications that use switch 136 may be deactivated. In other words, using the example immediately above, switch 136 normal mode (where switch 136 is manipulated with a first sequence to call the traditional function) may be deactivated (temporarily) when switch 136 is manipulated with a second sequence (e.g., three quick consecutive pushes on the volume button) to call a different function such as moving from private mode to non-private mode for one or more sensors.

An embodiment does more than allow a hardware switch to control capabilities on a platform such as, in a binary fashion, toggle a sensor controller from private mode to non-private mode. The embodiment allows for granularity whereby different levels of obfuscation/clarity/detail are applied to the sensor data. For example, one activation of switch 136 may move a GPS based sensor controller from non-private mode (where the exact latitude and longitude coordinates for system 100 are passed to the application) to a first private mode whereby no location data is passed to an application seeking such information. However, two quick and successive activations of switch 136 may move a GPS based sensor controller from the first private mode to a second private mode whereby only the city level coordinates are passed to the application. As another example, one activation of switch 136 may move a GPS based sensor controller from non-private mode (where the exact latitude and longitude coordinates for system 100 are passed to the application) to a first private mode (whereby no location data is passed to an application seeking such information) while also keeping the microphone controller in non-private mode. However, two quick and successive activations of switch 136 may move the GPS based sensor controller from non-private mode to private mode (or confirm/ensure the GPS based sensor is in private mode) and also move the microphone controller from non-private mode to private mode.

Figure 6:
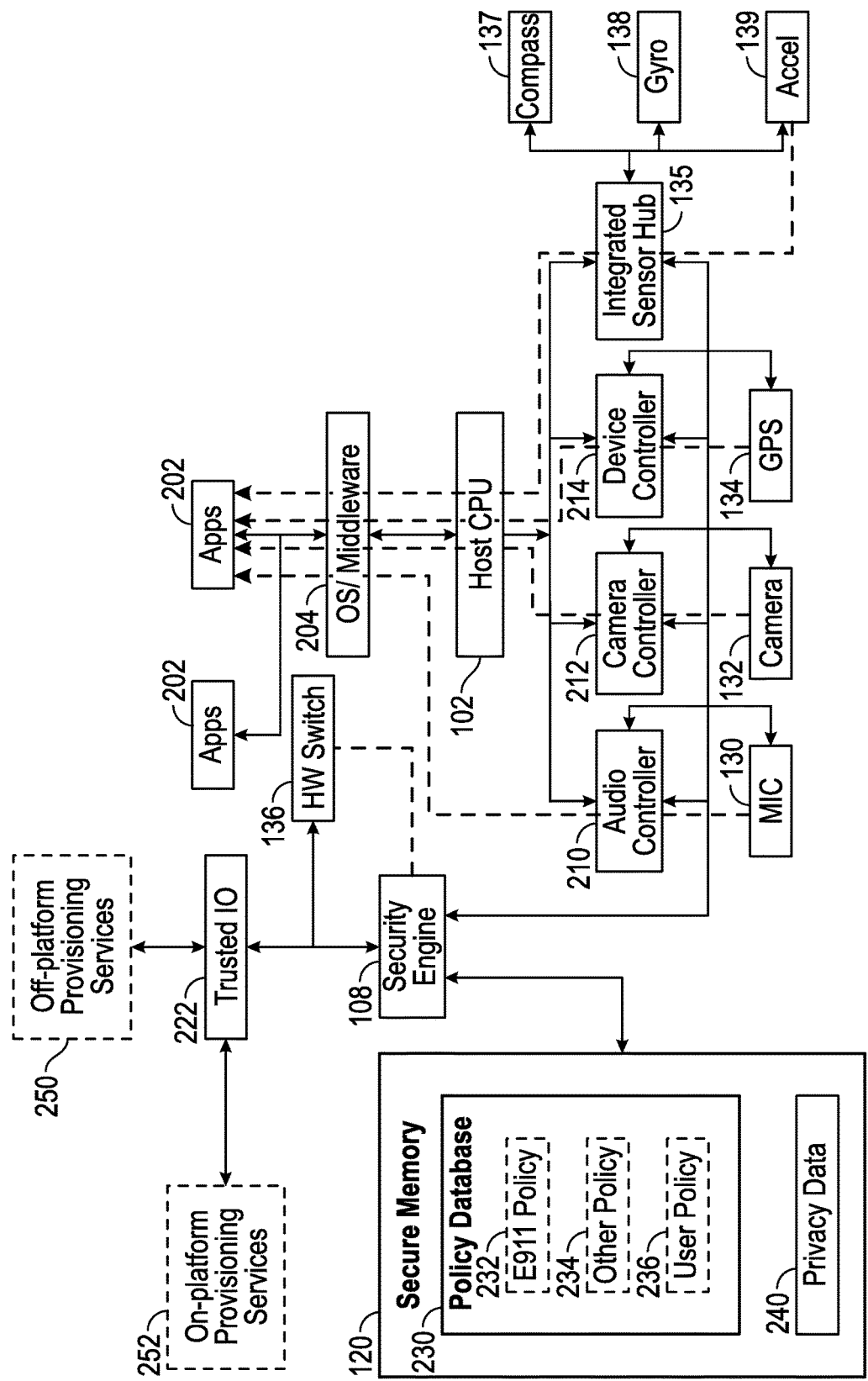
FIG. 6 is a simplified block diagram of at least one embodiment of an environment of the computing device of FIG. 5.
Figure 7:
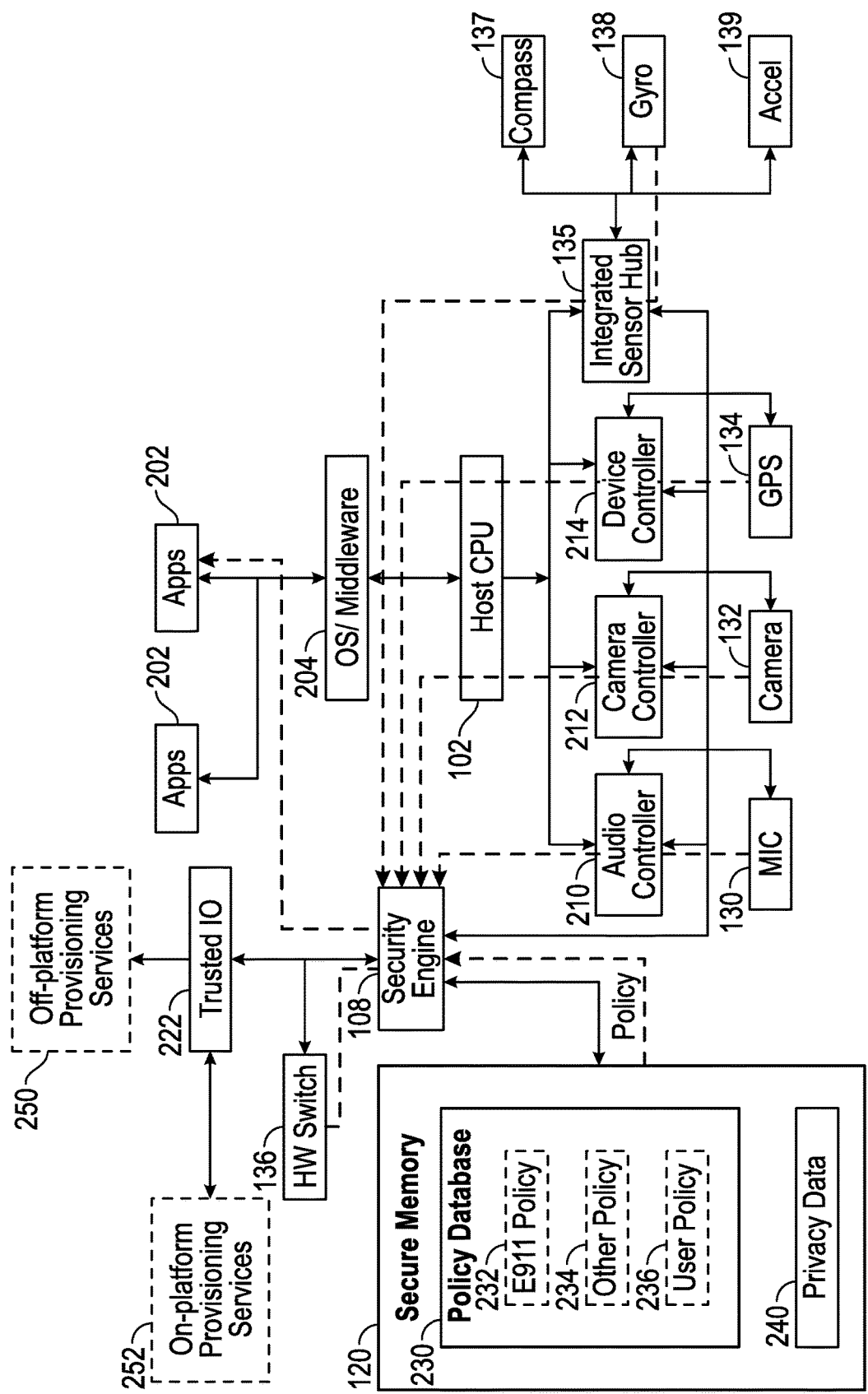
FIG. 7 is a simplified block diagram of at least one embodiment of an environment of the computing device of FIG. 5.

FIG. 6 is similar to FIG. 2 and similar components will not be described again for the sake of clarity. FIG. 6 includes hardware switch 136, processor 102, and ISH 135 (along with compass sensor 137, gyroscope sensor 138, and accelerometer sensor 139), which were discussed at length with regard to FIG. 5. Switch 136 is shown coupled to the I/O path between trusted I/O 222 and security engine 108. However, in another embodiment switch 136 may avoid the I/O path between trusted I/O 222 and security engine 108 and instead (see dashed lines) more directly interface security engine 108 via a separate I/O path. The dark dashed lines emanating from the sensors show how sensor data from sensors 130, 132, 134, 137, 138, and/or 139 bypass security engine 108 and pass from their respective controllers 210, 212, 214, 135 to processor 102, OS/middleware 204, and on to applications 202. However, in FIG. 7 the dark dashed lines show how sensor data from sensors 130, 132, 134, 137, 138, and/or 139 pass from their respective controllers 210, 212, 214, 135 to security engine 108 and then to processor 102, OS/middleware 204, and on to applications 202.

Figure 8:
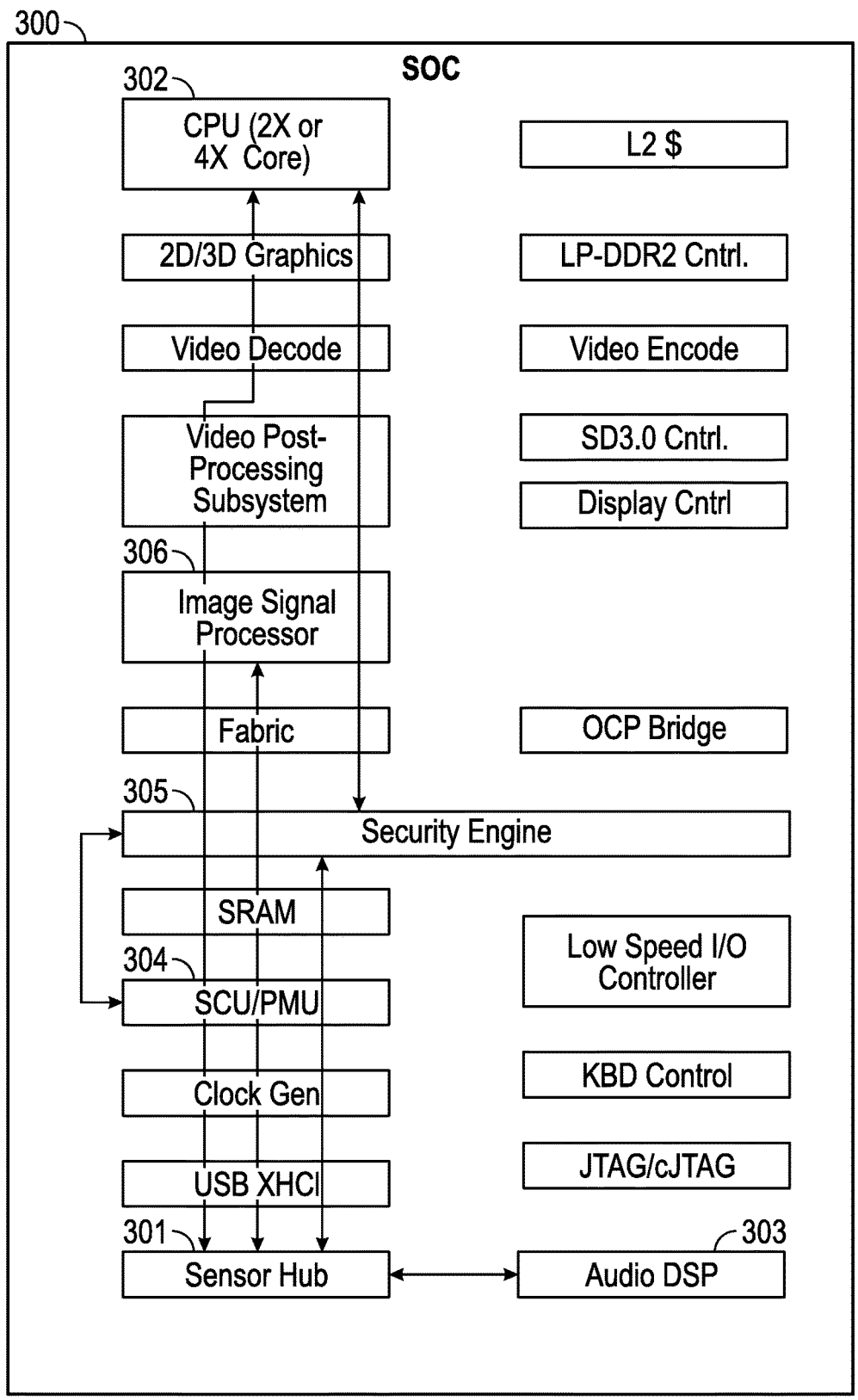
FIG. 8 is a simplified intellectual property block intercommunication system in an embodiment of the invention.

FIG. 8 shows how interprocessor communication (IPC) may be used for passing messages between host drivers and intellectual property (IP) blocks located on SoC 300. For example, in non-private mode an IPC may pass sensor data from ISH IP block 301 to host processor IP block 302. In other words, this allows for peer-to-peer, direct communication between IP blocks. Such direct communication is also shown between IP blocks 301 and 303, between IP blocks 301 and 306, and between IP blocks 304 (system controller unit/power management controller) and 305. However, in private mode direct communication is between IP block 301 and security engine IP block 305, which then communications with processor IP block 302.

In an embodiment ISH (and other sensor controllers) and processor threads communicate using the POSIX application program interface (API) mq_send and mq_recieve functions. A set of registers implemented in the ISH are used for ISH-to-IP block and IP block-to-ISH messaging. A similar set of registers is implemented for messages between the ISH and the security engine, audio controller and camera controller. Each IP block (such as blocks 301—ISH, 303—microphone or audio controller, 305—security engine, 306—camera controller) has a unique initiator ID to be used for non-private mode communications. Also, each IP block may have an extra bit added to the unique initiator ID to be used for private mode communications. The IP block's node behavior (private mode vs. non-private de) can then be adjusted based on which initiator ID is used (the initiator ID for non-private mode vs. the bit and initiator ID for private mode).

Figure 9:
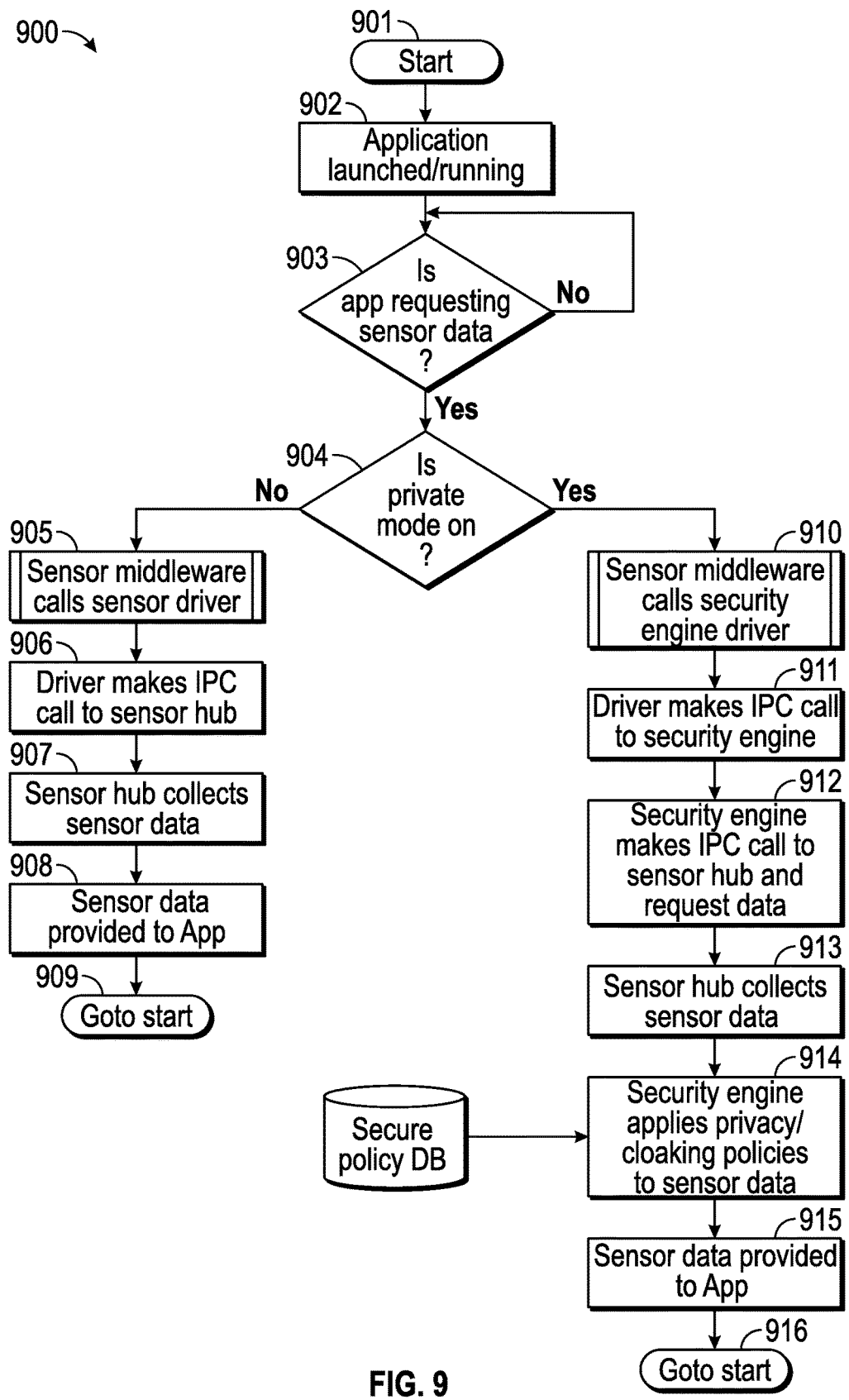
FIG. 9 a simplified flow diagram of at least one embodiment of a method for changing a sensor mode of a sensor of the computing device of FIG. 5.

FIG. 9 is a flowchart showing how, in one embodiment, the sensor data flow is modified when the device is in a cloaking or private mode. Process 900 begins (block 901) and then, once an application (such as application 202) is running (block 902), the process determines if the application is requesting any sensor data (903). If not, the process checks again at a later time. However, if sensor data is requested the process then determines if private mode is set for the sensor/sensor controller from which the application is requesting data (block 904). If the private mode is not on, then sensor middleware of the sensor control calls a sensor driver (block 905) and the driver makes an IPC call to ISH (block 906). The ISH collects sensor data (block 907), which is then sent to the application (block 908) bypassing the security engine before the process returns to its start (block 909).

However, if private mode is set, then sensor middleware of the sensor controller (e.g., ISH) calls a security engine driver (block 910) that makes an IPC call to the security engine (block 911). The security engine then makes an IPC call to the ISH (or other sensor controllers) and requests sensor data (block 912). The ISH (or other sensor controller) collects the sensor data (block 913) and sends the data to the security engine. The security engine then applies privacy/cloaking policies (e.g., from the policy database 230) to the sensor data (block 914). The sensor data is then provided from the security engine to the application (block 915) before returning to the process start (block 916).

The embodiment of process 900 takes advantage of the ability to route sensor data through the security engine, thereby controlling the information that is passed onto the host processor. This level of control, and the ability for the end user to exercise this control (with granularity), provides value to any user that desires better control of her or his privacy.

Embodiments discussed herein may utilize a system such as the system of FIG. 10, discussed below. In fact, embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

Figure 10:
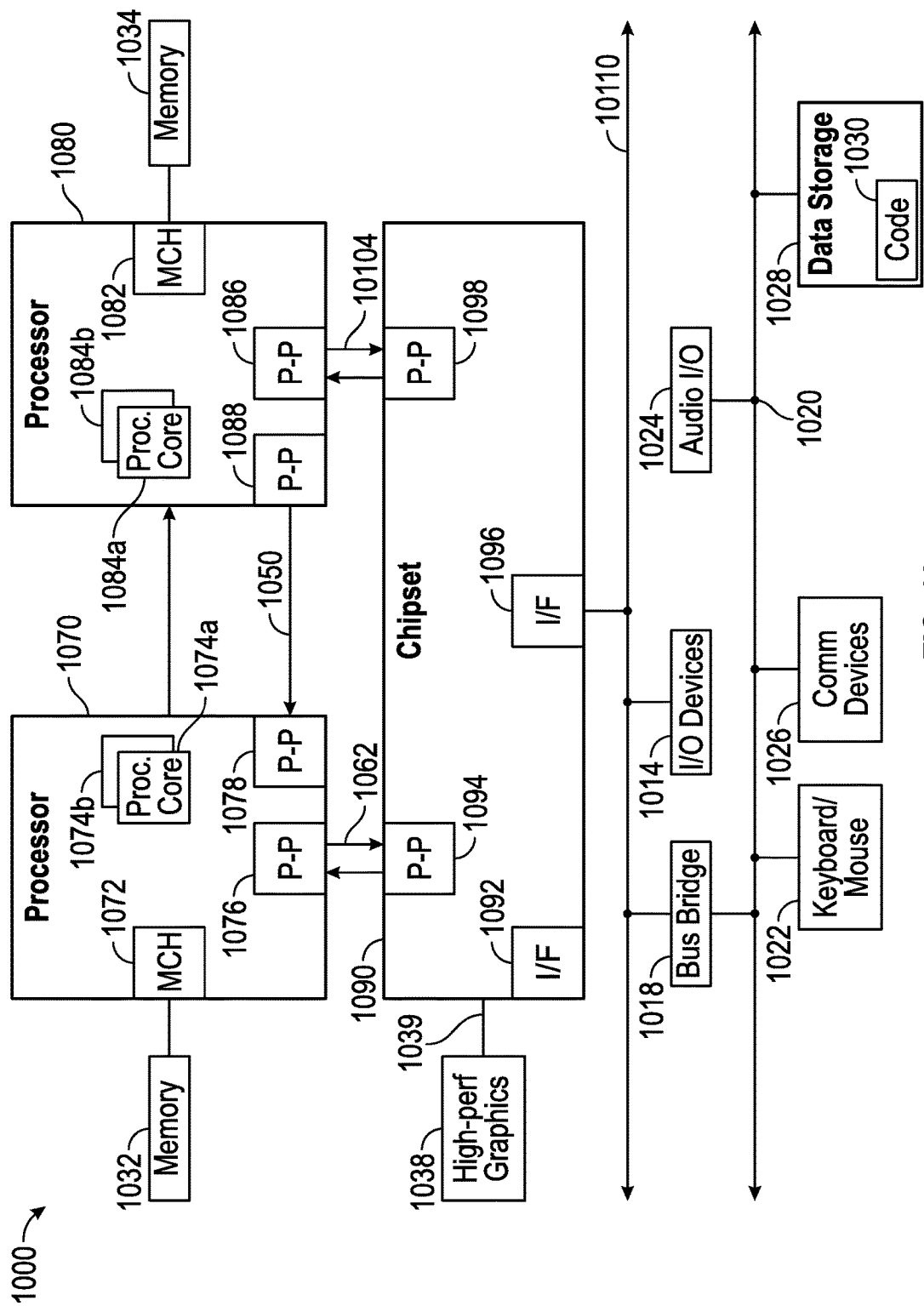
FIG. 10 is a computing node for operation with various embodiments of the invention.

Referring now to FIG. 10, shown is a block diagram of a system embodiment 1000 in accordance with an embodiment of the present invention. System 1000 may be included in, for example, a mobile computing node such as a cellular phone, smartphone, tablet, Ultrabook®, notebook, laptop, personal digital assistant, and mobile processor based platform.

Shown is a multiprocessor system 1000 that includes a first processing element 1070 and a second processing element 1080. While two processing elements 1070 and 1080 are shown, it is to be understood that an embodiment of system 1000 may also include only one such processing element. System 1000 is illustrated as a point-to-point interconnect system, wherein the first processing element 1070 and second processing element 1080 are coupled via a point-to-point interconnect 1050. It should be understood that any or all of the interconnects illustrated may be implemented as a multi-drop bus rather than point-to-point interconnect. As shown, each of processing elements 1070 and 1080 may be multicore processors, including first and second processor cores (i.e., processor cores 1074*a* and 1074*b* and processor cores 1084*a* and 1084*b*). Such cores 1074, 1074*b*, 1084*a*, 1084*b* may be configured to execute instruction code in a manner similar to methods discussed herein.

Each processing element 1070, 1080 may include at least one shared cache. The shared cache may store data (e.g., instructions) that are utilized by one or more components of the processor, such as the cores 1074*a*, 1074*b* and 1084*a*, 1084*b*, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. MC's 1072 and 1082 couple the processors to respective memories, namely a memory 1032 and a memory 1034, which may be portions of main memory locally attached to the respective processors. While MC logic 1072 and 1082 is illustrated as integrated into the processing elements 1070, 1080, for alternative embodiments the MC logic may be discreet logic outside the processing elements 1070, 1080 rather than integrated therein.

First processing element 1070 and second processing element 1080 may be coupled to an I/O subsystem 1090 via P-P interfaces 1076, 1086 via P-P interconnects 1062, 10104, respectively. SoC 1090 may cooperate with other SoCs (e.g., SoC 300) via any of various paths (e.g., 1039, 10110). As shown, I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, a bus may be used to couple graphics engine 1038 to I/O subsystem 1090. Alternately, a point-to-point interconnect 1039 may couple these components.

In turn, I/O subsystem 1090 may be coupled to a first bus 10110 via an interface 1096. In one embodiment, first bus 10110 may be a Peripheral Component Interconnect (PCI) bus, or a bus such as a PCI Express bus or another third generation I/O interconnect bus, although the scope of the present invention is not so limited.

As shown, various I/O devices 1014, 1024 may be coupled to first bus 10110, along with a bus bridge 1018 which may couple first bus 10110 to a second bus 1020. In one embodiment, second bus 1020 may be a low pin count (LPC) bus. Various devices may be coupled to second bus 1020 including, for example, a keyboard/mouse 1022, communication device(s) 1026 (which may in turn be in communication with a computer network), and a data storage unit 1028 such as a disk drive or other mass storage device which may include code 1030, in one embodiment. The code 1030 may include instructions for performing embodiments of one or more of the methods described above. Further, an audio I/O 1024 may be coupled to second bus 1020.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code. The controllers (e.g., 206, 135) are each modules as is security engine 108 and the sensors 130, 132, 134, 137, 138, 139. The "boundaries" between any of these modules may be merely for illustration and a person of ordinary skill in the art will appreciate that sending data from one module does not necessarily mean that data could not be said to have been sent from another module. However, some embodiments explicitly state that a module is bypassed.

Illustrative examples of the devices, systems, and methods disclosed herein are provided below. An embodiment of the devices, systems, and methods may include any one or more, and any combination of, the examples described below.

Example Set 1

Example 1 includes a computing device comprising a sensor; and a sensor controller to (i) receive sensor data from the sensor, (ii) determine a sensor mode for the sensor, and (iii) send privacy data in place of the sensor data in response to a determination that the sensor mode for the sensor is set to a private mode.

Example 2 includes the subject matter of Example 1, and wherein the sensor controller is further to send sensor data in response to a determination that the sensor mode for the sensor is not set to the private mode.

Example 3 includes the subject matter of any of Examples 1 and 2, and further including a security engine; and a private bus established between the security engine and the sensor controller, wherein the security engine is to (i) receive a sensor mode change command from a user of the computing device via a trusted I/O path of the computing device and (i) send a mode command to the sensor controller over the private bus to set the sensor mode of the sensor based on the sensor mode change command.

Example 4 includes a method for managing sensor privacy of a computing device, the method comprising receiving, by a sensor controller of the computing device, sensor data from a sensor of the computing device; determining, by a sensor controller, a sensor mode for the sensor; and sending, by the sensor controller, privacy data in place of the sensor data in response to a determination that the sensor mode for the sensor is set to a private mode.

Example 5 includes the subject matter of Example 4, and further including sending, by the sensor controller, the sensor data in response to a determination that the sensor mode for the sensor is not set to the private mode.

Example 6 includes the subject matter of any of Examples 4 and 5, and further including receiving, by a security engine of the computing device, a sensor mode change command from a user of the computing device via a trusted I/O path of the computing device; and sending, by the security engine, a mode command to the sensor controller to set the sensor mode of the sensor based on the sensor mode change command, wherein the sending the mode command comprises sending the mode command over a private bus established between the security engine and the sensor controller.

Example 7 includes one or more machine-readable storage media comprising a plurality of instructions stored thereon that in response to being executed result in a computing device performing the method of any of Examples 4-6.

Example Set 2

Example 1 includes a computing device comprising: a processor; a sensor; and a sensor controller, coupled to the sensor and the processor, to (i) receive sensor data from the sensor, (ii) determine a sensor mode for the sensor, and (iii) send privacy data, in place of at least a portion of the sensor data, to an application in response to determining the sensor mode corresponds to a private mode. The controller may determine the mode by, for example, receiving a certain message from the processor indicating the mode is a certain mode or the mode should change to another mode.

An alternative embodiment of Example 1 includes a computing device comprising: a processor; a sensor; a security engine out-of-band (OOB) from the processor; and a sensor controller, coupled to the sensor and the processor and the security engine, to receive sensor data from the sensor and determine a sensor mode for the sensor; wherein at least one of the security engine and the sensor controller are to send privacy data, in place of at least a portion of the sensor data, to an application in response to determining the sensor mode corresponds to a private mode.

In example 2 the subject matter of Example 1 can optionally include wherein the sensor controller is to send the sensor data to the application in response to determining the sensor mode corresponds to non-private mode.

In example 3 the subject matter of Examples 1-2 can optionally include The computing device of claim 2, further comprising: a security engine out-of-band (OOB) from the processor; and an OOB private bus between the security engine and the sensor controller; wherein the security engine is to (i) receive a first sensor mode change command, from a user of the computing device, via a trusted input/output path of the computing device, and (ii) in response to receiving the first sensor mode change command, send a second sensor mode change command to the sensor controller over the private bus to change the sensor mode between private mode and non-private mode.

An alternative embodiment of example 3 includes an OOB private bus between the security engine and the sensor controller; wherein the security engine is to (i) receive a first sensor mode change command, from a user of the computing device, via a trusted input/output path of the computing device, and (ii) in response to receiving the first sensor mode change command, send a second sensor mode change command to the sensor controller over the private bus to change the sensor mode between private mode and non-private mode.

In example 4 the subject matter of Examples 1-3 can optionally include a hardware switch; wherein the security engine is to receive the first sensor mode change command in response to the user directly and physically manipulating the hardware switch. In an embodiment the hardware switch is coupled to a hardware register.

In example 5 the subject matter of Examples 1-4 can optionally include an additional sensor; an additional hardware switch; wherein the security engine is to receive an additional first sensor mode change command in response to the user directly and physically manipulating the additional hardware switch; wherein the first sensor mode change command corresponds to the sensor and the additional first sensor mode change command corresponds to the additional sensor. In an embodiment the additional hardware switch is coupled to an additional hardware register.

In example 6 the subject matter of Examples 1-5 can optionally include wherein (a) the security engine is to send the privacy data to the application, and (b) the sensor controller is to bypass the security engine and send the sensor data to the application without sending the sensor data to the security engine.

In example 7 the subject matter of Examples 1-6 can optionally include at least one hardware switch; a security engine out-of-band from the processor; and a private bus between the security engine and the sensor controller, wherein the security engine is to (i) receive at least one of a first sensor mode change command and an additional first sensor mode change command, from a user of the computing device, via a trusted input/output path coupled to the at least one hardware switch, (ii) in response to receiving the first sensor mode change command, send a second sensor change mode command to the sensor controller over the private bus to change the sensor mode to a private mode, (iii) in response to receiving the additional first sensor mode change command, send an additional second sensor mode change command to the sensor controller over the private bus to change the sensor mode to an additional private mode; wherein the sensor controller is to send the privacy data in response to sending the second sensor mode command and send additional privacy data, which is unequal to the privacy data, to the application in response to sending the additional second sensor mode command. For example, one click of a hardware switch may result in partially obscured privacy data being sent to an application and two clicks of a hardware switch may result in more fully obscured privacy data being sent to the application.

An alternative embodiment of Example 7 includes at least one hardware switch; and a private bus between the security engine and the sensor controller; wherein the security engine is to: (i) receive at least one of a first sensor mode change command and an additional first sensor mode change command, from a user of the computing device, via a trusted input/output path coupled to the at least one hardware switch, (ii) in response to receiving the first sensor mode change command, send a second sensor change mode command to the sensor controller over the private bus to change the sensor mode to a private mode, (iii) in response to receiving the additional first sensor mode change command, send an additional second sensor mode change command to the sensor controller over the private bus to change the sensor mode to an additional private mode; wherein the sensor controller is to send the privacy data in response to sending the second sensor mode command and send additional privacy data, which is unequal to the privacy data, to the application in response to sending the additional second sensor mode command.

In example 8 the subject matter of Examples 1-7 can optionally include wherein the privacy data includes an altered form of the sensor data and the additional privacy data includes a more altered form of the sensor data that is more dissimilar to the sensor data than the privacy data. For example, the privacy data may include a city block address for the device and the additional privacy data may include city, state data that is less detailed than the bock address.

In example 9 the subject matter of Examples 1-8 can optionally include wherein (a) the security engine is to receive the first sensor mode change command in response to the user directly and physically manipulating the at least one hardware switch with a first manipulation pattern, and (b) the security engine is to receive the additional first sensor mode change command in response to the user directly and physically manipulating the at least one hardware switch with a second manipulation pattern unequal to the first manipulation pattern.

In example 10 the subject matter of Examples 1-9 can optionally include wherein the security engine is to evaluate a policy and authorize the first sensor mode change command in response to evaluating the policy.

In example 11 the subject matter of Examples 1-10 can optionally include wherein the privacy data includes an altered form of the sensor data.

Another embodiment of example 11 includes a hardware switch; wherein (a) the security engine is to receive the first sensor mode change command in response to the user directly and physically manipulating the hardware switch, (b) in response to receiving the first sensor mode change command, the security engine is to send the second sensor mode change command to the sensor controller but not to an additional sensor controller that is coupled to an additional sensor included in the computing device. Thus, there is granularity in that one sensor, but not all sensors, need to be changed in lock step with one another. Therefore, one sensor can correspond to private mode while another sensor may correspond to non-private mode.

Another embodiment of example 11 includes a hardware switch; wherein (a) the security engine is to receive the first sensor mode change command in response to the user directly and physically manipulating the hardware switch, and (b) the second sensor mode change command is not configured to change an additional sensor mode for an additional sensor included in the device between private mode and non-private mode. Thus, there is granularity in that one sensor, but not all sensors, need to be changed in lock step with one another. Therefore, one sensor can correspond to private mode while another sensor may correspond to non-private mode.

In example 12 the subject matter of Examples 1-11 can optionally include wherein the sensor data relates to a physical location of the computing device and the privacy data includes an abstracted form of the sensor data that provides an additional physical location of the computing device that is less specific than the physical location.

In example 13 the subject matter of Examples 1-12 can optionally include wherein sensor controller includes at least one of an integrated sensor hub, an audio controller, a camera controller, and a device controller that controls functionality of a location determination module. The device controller that controls functionality of a location determination module may relate to a GPS.

In example 14 the subject matter of Examples 1-13 can optionally include wherein the sensor controller is to (i) receive additional sensor data from the sensor and an additional sensor that is included in the computing device, (ii) determine the sensor mode for the sensor and an additional sensor mode for the additional sensor, and (iii) send additional privacy data, in place of the additional sensor data, to the application in response to determining the sensor mode and the additional sensor mode both correspond to the private mode.

In example 15 the subject matter of Examples 1-14 can optionally include wherein the privacy data includes at least one of white noise, an image stored in the memory before the sensor controller receives the sensor data, and alternate location coordinate unequal to an actual location coordinate of the computing device at a time when the sensor controller receives the sensor data.

Example 16 includes at least one storage medium having instructions stored thereon for causing: a sensor controller, coupled to a sensor and a processor, to (i) receive sensor data from the sensor, (ii) determine a sensor mode for the sensor, (iii) send privacy data, in place of at least a portion of the sensor data, to an application in response to determining the sensor mode corresponds to a private mode, and (iv) send the sensor data to the application in response to determining the sensor mode corresponds to non-private mode.

An alternative embodiment of Example 16 includes at least one storage medium having instructions stored thereon for causing: a sensor controller, coupled to a sensor and a security engine and a processor, to (i) receive sensor data from the sensor, (ii) determine a sensor mode for the sensor, and (iii) send the sensor data to the application in response to determining the sensor mode corresponds to non-private mode; wherein at least one of the security engine and the sensor controller are to send privacy data, in place of at least a portion of the sensor data, to an application in response to determining the sensor mode corresponds to a private mode.

In example 17 the subject matter of Examples 16 can optionally include instructions to cause: a security engine, out-of-band (OOB) from the processor, to (i) receive a first sensor mode change command via a trusted input/output path of the computing device, and (ii) in response to receiving the first sensor mode change command, send a second sensor mode change command to the sensor controller over a private bus, which is OOB and located between the security engine and the sensor controller, to change the sensor mode between private mode and non-private mode.

An alternative embodiment of example 17 includes instructions to cause the security engine to (i) receive a first sensor mode change command via a trusted input/output path of the computing device, and (ii) in response to receiving the first sensor mode change command, send a second sensor mode change command to the sensor controller over a private bus, which is OOB and located between the security engine and the sensor controller, to change the sensor mode between private mode and non-private mode.

In example 18 the subject matter of Examples 16-17 can optionally include instructions to cause the security engine is to receive the first sensor mode change command in response to the user directly and physically manipulating a hardware switch.

In example 19 the subject matter of Examples 16-18 can optionally include instructions to cause the security engine to receive an additional first sensor mode change command in response to the user directly and physically manipulating an additional hardware switch; wherein the first sensor mode change command corresponds to the sensor and the additional first sensor mode change command corresponds to an additional sensor.

In example 20 the subject matter of Examples 16-19 can optionally include instructions to cause (a) the security engine is to send the privacy data to the application, and (b) the sensor controller to bypass the security engine and send the sensor data to the application without sending the sensor data to the security engine.

In example 21 the subject matter of Examples 16-20 can optionally include instructions to cause an out-of-band security engine to (i) receive at least one of a first sensor mode change command and an additional first sensor mode change command, from a user of the computing device, via a trusted input/output path coupled to at least one hardware switch, (ii) in response to receiving the first sensor mode change command, send a second sensor change mode command to the sensor controller over a private bus, between the security engine and the sensor controller, to change the sensor mode to a private mode, (iii) in response to receiving the additional first sensor mode change command, send an additional second sensor mode change command to the sensor controller over the private bus to change the sensor mode to an additional private mode; wherein the sensor controller is to send the privacy data in response to sending the second sensor mode command and send additional privacy data, which is unequal to the privacy data, to the application in response to sending the additional second sensor mode command.

An alternative embodiment of example 21 includes instructions to cause the security engine to (i) receive at least one of a first sensor mode change command and an additional first sensor mode change command, from a user of the computing device, via a trusted input/output path coupled to at least one hardware switch, (ii) in response to receiving the first sensor mode change command, send a second sensor change mode command to the sensor controller over a private bus, between the security engine and the sensor controller, to change the sensor mode to a private mode, (iii) in response to receiving the additional first sensor mode change command, send an additional second sensor mode change command to the sensor controller over the private bus to change the sensor mode to an additional private mode; wherein the sensor controller is to send the privacy data in response to sending the second sensor mode command and send additional privacy data, which is unequal to the privacy data, to the application in response to sending the additional second sensor mode command.

In example 22 the subject matter of Examples 16-21 can optionally include wherein the privacy data includes an altered form of the sensor data and the additional privacy data includes a more altered form of the sensor data that is more dissimilar to the sensor data than the privacy data.

In example 23 the subject matter of Examples 16-22 can optionally include instructions to cause (a) the security engine to receive the first sensor mode change command in response to the user directly and physically manipulating the at least one hardware switch with a first manipulation pattern, and (b) the security engine to receive the additional first sensor mode change command in response to the user directly and physically manipulating the at least one hardware switch with a second manipulation pattern unequal to the first manipulation pattern.

In example 24 the subject matter of Examples 16-13 can optionally include wherein the sensor data relates to a physical location of the computing device and the privacy data includes an abstracted form of the sensor data that provides an additional physical location of the computing device that is less specific than the physical location.

In example 25 the subject matter of Examples 16-24 can optionally include instructions to cause the sensor controller to (i) receive additional sensor data from the sensor and an additional sensor that is included in the computing device, (ii) determine the sensor mode for the sensor and an additional sensor mode for the additional sensor, and (iii) send additional privacy data, in place of the additional sensor data, to the application in response to determining the sensor mode and the additional sensor mode both correspond to the private mode.

Another embodiment of example 25 includes instructions to cause the security engine to receive the first sensor mode change command in response to the user directly and physically manipulating a hardware switch, wherein the second sensor mode change command is not configured to change an additional sensor mode for an additional sensor included in the device between private mode and non-private mode.

Example Set 3

Example 1 includes a method comprising: a sensor controller, coupled to a sensor and a security engine and a processor, (i) receiving sensor data from the sensor, (ii) determining a sensor mode for the sensor, and (iii) sending the sensor data to the application in response to determining the sensor mode corresponds to non-private mode; at least one of the security engine and the sensor controller sending privacy data, in place of at least a portion of the sensor data, to an application in response to determining the sensor mode corresponds to a private mode.

In example 2 the subject matter of the Example 1 can optionally include the security engine (i) receiving a first sensor mode change command via a trusted input/output path of the computing device, and (ii) in response to receiving the first sensor mode change command, sending a second sensor mode change command to the sensor controller over a private bus, which is OOB and located between the security engine and the sensor controller, to change the sensor mode between private mode and non-private mode.

In example 3 the subject matter of the Examples 1-2 can optionally include the security engine receiving the first sensor mode change command in response to the user directly and physically manipulating a hardware switch.

In example 4 the subject matter of the Examples 1-3 can optionally include the security engine receiving an additional first sensor mode change command in response to the user directly and physically manipulating an additional hardware switch; wherein the first sensor mode change command corresponds to the sensor and the additional first sensor mode change command corresponds to an additional sensor.

In example 5 the subject matter of the Examples 1-4 can optionally include (a) the security engine sending the privacy data to the application, and (b) the sensor controller bypassing the security engine and sending the sensor data to the application without sending the sensor data to the security engine.

In example 6 the subject matter of the Examples 1-5 can optionally include the security engine (i) receiving at least one of a first sensor mode change command and an additional first sensor mode change command, from a user of the computing device, via a trusted input/output path coupled to at least one hardware switch, (ii) in response to receiving the first sensor mode change command, sending a second sensor change mode command to the sensor controller over a private bus, between the security engine and the sensor controller, to change the sensor mode to a private mode, (iii) in response to receiving the additional first sensor mode change command, sending an additional second sensor mode change command to the sensor controller over the private bus to change the sensor mode to an additional private mode; the sensor controller sending the privacy data in response to sending the second sensor mode command and sending additional privacy data, which is unequal to the privacy data, to the application in response to sending the additional second sensor mode command.

In example 7 the subject matter of the Examples 1-6 can optionally include wherein the privacy data includes an altered form of the sensor data and the additional privacy data includes a more altered form of the sensor data that is more dissimilar to the sensor data than the privacy data.

In example 8 the subject matter of the Examples 1-7 can optionally include (a) the security engine receiving the first sensor mode change command in response to the user directly and physically manipulating the at least one hardware switch with a first manipulation pattern, and (b) the security engine receiving the additional first sensor mode change command in response to the user directly and physically manipulating the at least one hardware switch with a second manipulation pattern unequal to the first manipulation pattern.

In example 9 the subject matter of the Examples 1-8 can optionally include wherein the sensor data relates to a physical location of the computing device and the privacy data includes an abstracted form of the sensor data that provides an additional physical location of the computing device that is less specific than the physical location.

In example 10 the subject matter of the Examples 1-9 can optionally include the security engine receiving the first sensor mode change command in response to the user directly and physically manipulating a hardware switch, wherein the second sensor mode change command is not configured to change an additional sensor mode for an additional sensor included in the device between private mode and non-private mode.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The invention claimed is:

1. A computing device comprising:
a processor;
a sensor;
a security engine out-of-band (OOB) from the processor; and
a sensor controller, coupled to the sensor and the processor and the security engine, to receive sensor data from the sensor and determine a sensor mode for the sensor;
wherein the security engine is to send privacy data, in place of at least a portion of the sensor data, to an application in response to determining the sensor mode corresponds to a private mode;
wherein the sensor controller is to (i) send the sensor data to the application in response to determining the sensor mode corresponds to non-private mode, and (ii) bypass the security engine and send the sensor data to the application without sending the sensor data to the security engine.

2. The computing device of claim 1, further comprising:
a private bus coupled to the security engine and the sensor controller;
wherein the security engine is to (i) receive a user-initiated first sensor mode change command via a trusted input/output path of the computing device, and (ii) in response to receiving the first sensor mode change command, send a second sensor mode change command to the sensor controller over the private bus to change the sensor mode between private mode and non-private mode.

3. The computing device of claim 2 comprising a hardware switch; wherein the security engine is to receive the first sensor mode change command in response to a direct and physical user-initiated manipulation of the hardware switch.

4. The computing device of claim 3 comprising:
an additional sensor; and
an additional hardware switch;
wherein the security engine is to receive an additional first sensor mode change command in response to a direct and physical user-initiated manipulation of the additional hardware switch;
wherein the first sensor mode change command corresponds to the sensor and the additional first sensor mode change command corresponds to the additional sensor.

5. The computing device of claim 1, further comprising:
at least one hardware switch; and
a private bus between the security engine and the sensor controller;
wherein the security engine is to: (i) receive at least one of a user-initiated first sensor mode change command and a user-initiated additional first sensor mode change command via a trusted input/output path coupled to the at least one hardware switch, (ii) in response to receiving the first sensor mode change command, send a second sensor change mode command to the sensor controller over the private bus to change the sensor mode to a private mode, (iii) in response to receiving the additional first sensor mode change command, send an additional second sensor mode change command to the sensor controller over the private bus to change the sensor mode to an additional private mode;
wherein the sensor controller is to send the privacy data in response to sending the second sensor mode command and send additional privacy data, which is unequal to the privacy data, to the application in response to sending the additional second sensor mode command.

6. The computing device of claim 5, wherein the privacy data includes an altered form of the sensor data and the additional privacy data includes a more altered form of the sensor data that is more dissimilar to the sensor data than the privacy data.

7. The computing device of claim 6, wherein (a) the security engine is to receive the first sensor mode change command in response to a direct and physical user-initiated manipulation of the at least one hardware switch with a first manipulation pattern, and (b) the security engine is to receive the additional first sensor mode change command in response to a direct and physical user-initiated manipulation of the at least one hardware switch with a second manipulation pattern unequal to the first manipulation pattern.

8. The computing device of claim 2, wherein the security engine is to evaluate a policy and authorize the first sensor mode change command in response to evaluating the policy.

9. The computing device of claim 2 comprising a hardware switch, an additional sensor controller, and an additional sensor that is coupled to the additional sensor controller; wherein (a) the security engine is to receive the first sensor mode change command in response to a direct and physical user-initiated manipulation of the hardware switch, (b) in response to receiving the first sensor mode change command, the security engine is to send the second sensor mode change command to the sensor controller but not to the additional sensor controller.

10. The computing device of claim 1, wherein the sensor data relates to a physical location of the computing device and the privacy data includes an abstracted form of the sensor data that provides an additional physical location of the computing device that is less specific than the physical location.

11. The computing device of claim 2 comprising a hardware switch; wherein (a) the security engine is to receive the first sensor mode change command in response to a direct and physical user-initiated manipulation of the hardware switch, and (b) the second sensor mode change command is not configured to change an additional sensor mode for an additional sensor included in the device between private mode and non-private mode.

12. The computing device of claim 1 comprising an additional sensor, and an additional sensor controller coupled to the additional sensor; wherein the additional sensor controller is to (i) receive additional sensor data from the additional sensor, (ii) determine an additional sensor mode for the additional sensor, and (iii) send the additional sensor data to the application in response to determining the additional sensor mode corresponds to non-private mode.

13. The computing device of claim 1,
wherein the privacy data includes at least one of white noise, an image stored in the memory before the sensor controller receives the sensor data, and an alternate location coordinate unequal to an actual location coordinate of the computing device
wherein the sensor controller includes at least one of an integrated sensor hub, an audio controller, a camera controller, and a device controller that controls functionality of a location determination module.

14. At least one non-transitory storage medium having instructions stored thereon for causing:
a sensor controller, coupled to a sensor and a security engine and a processor, to (i) receive sensor data from the sensor, (ii) determine a sensor mode for the sensor, and (iii) bypass the security engine and send the sensor data to an application (iii)(a) in response to determining the sensor mode corresponds to a non-private mode, and (iii)(b) without sending the sensor data to the security engine; and
the security engine to send privacy data, in place of at least a portion of the sensor data, to the application in response to determining the sensor mode corresponds to a private mode.

15. The at least one medium of claim 14 comprising instructions to cause the security engine to (i) receive a first sensor mode change command via a trusted input/output path of the computing device, and (ii) in response to receiving the first sensor mode change command, send a second sensor mode change command to the sensor controller over a private bus, which is coupled to the security engine and the sensor controller, to change the sensor mode between private mode and non-private mode.

16. The at least one medium of claim 15 comprising instructions to cause the security engine to receive the first sensor mode change command in response to a direct and physical user-initiated manipulation of a hardware switch; wherein;
the sensor controller, the sensor, the security engine, and the processor security engine are all included in a system that is encapsulated entirely within an outermost physical container package;
at least a portion of the hardware switch is located outside the container package and is not fully encapsulated by the container package; and
the hardware switch is directly accessible to a user of the system.

17. The at least one medium of claim 16 comprising instructions to cause the security engine to receive an additional first sensor mode change command in response to a direct and physical user-initiated manipulation of an additional hardware switch;
wherein the first sensor mode change command corresponds to the sensor and the additional first sensor mode change command corresponds to an additional sensor.

18. The at least one medium of claim 14 comprising instructions to cause the security engine to (i) receive at least one of a user-initiated first sensor mode change command and a user-initiated additional first sensor mode change command, via a trusted input/output path coupled to at least one hardware switch, (ii) in response to receiving the first sensor mode change command, send a second sensor change mode command to the sensor controller over a private bus, between the security engine and the sensor controller, to change the sensor mode to a private mode, (iii) in response to receiving the additional first sensor mode change command, send an additional second sensor mode change command to the sensor controller over the private bus to change the sensor mode to an additional private mode;
wherein the sensor controller is to send the privacy data in response to sending the second sensor mode command and send additional privacy data, which is unequal to the privacy data, to the application in response to sending the additional second sensor mode command.

19. The at least one medium of claim 18, wherein the privacy data includes an altered form of the sensor data and the additional privacy data includes a more altered form of the sensor data that is more dissimilar to the sensor data than the privacy data.

20. The at least one medium of claim 14, wherein the sensor data relates to a physical location of the computing device and the privacy data includes an abstracted form of the sensor data that provides an additional physical location of the computing device that is less specific than the physical location.

21. The at least one medium of claim 15 comprising instructions to cause the security engine to receive the first sensor mode change command in response to a direct and physical user-initiated manipulation of a hardware switch, wherein the second sensor mode change command is not configured to change an additional sensor mode for an additional sensor included in the device between private mode and non-private mode.

22. At least one non-transitory storage medium having instructions stored thereon for causing:
a sensor controller, coupled to a sensor and a security engine and a processor, to (i) receive sensor data from the sensor, (ii) determine a sensor mode for the sensor, and (iii) send the sensor data to an application in response to determining the sensor mode corresponds to a non-private mode;
the security engine to (i) receive at least one of a user-initiated first sensor mode change command and a user-initiated additional first sensor mode change command, via a trusted input/output path coupled to at least one hardware switch, (ii) in response to receiving the first sensor mode change command, send a second sensor change mode command to the sensor controller over a private bus, between the security engine and the sensor controller, to change the sensor mode to a private mode, (iii) in response to receiving the additional first sensor mode change command, send an additional second sensor mode change command to the sensor controller over the private bus to change the sensor mode to an additional private mode;
wherein the sensor controller is to send (i) privacy data, in place of at least a portion of the sensor data, to the application in response to determining the sensor mode corresponds to a private mode, and (ii) additional privacy data, which is unequal to the privacy data, to the application in response to sending the additional second sensor mode command.

23. The at least one medium of claim 22, wherein the sensor data relates to a physical location of the computing device and the privacy data includes an abstracted form of the sensor data that provides an additional physical location of the computing device that is less specific than the physical location.

24. A computing device comprising:
a processor;

a sensor;

a security engine out-of-band (OOB) from the processor; and a sensor controller, coupled to the sensor and the processor and the security engine, to receive sensor data from the sensor and determine a sensor mode for the sensor;

a hardware switch, an additional sensor controller, and an additional sensor that is coupled to the additional sensor controller; and a private bus coupled to the security engine and the sensor controller;

wherein at least one of the security engine and the sensor controller are to send privacy data, in place of at least a portion of the sensor data, to an application in response to determining the sensor mode corresponds to a private mode;

wherein the sensor controller is to send the sensor data to the application in response to determining the sensor mode corresponds to a non-private mode;

wherein (a) the security engine is to receive a user-initiated first sensor mode change command, via a trusted input/output path of the computing device, in response to a direct and physical user-initiated manipulation of the hardware switch, (b) in response to receiving the first sensor mode change command, the security engine is to send a second sensor mode change command to the sensor controller, over the private bus to change the sensor mode between private mode and non-private mode, but not to the additional sensor controller.

25. The computing device of claim 24, wherein the sensor data relates to a physical location of the computing device and the privacy data includes an abstracted form of the sensor data that provides an additional physical location of the computing device that is less specific than the physical location.

\* \* \* \* \*